United States Patent
Ichimura et al.

(10) Patent No.: US 12,546,711 B2
(45) Date of Patent: Feb. 10, 2026

(54) CONCENTRATION MEASUREMENT APPARATUS COMPRISING AN INFRARED EFFECT DETECTION UNIT, A TEMPERATURE MEASUREMENT UNIT, AND A SIGNAL PROCESSING UNIT, AND CONCENTRATION MEASUREMENT METHOD

(71) Applicant: Asahi Kasei Microdevices Corporation, Tokyo (JP)

(72) Inventors: Kakeru Ichimura, Tokyo (JP); Takenobu Nakamura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 62 days.

(21) Appl. No.: 18/059,450

(22) Filed: Nov. 29, 2022

(65) Prior Publication Data
US 2023/0168192 A1    Jun. 1, 2023

(30) Foreign Application Priority Data

Nov. 29, 2021  (JP) .................................. 2021-193604
Nov. 25, 2022  (JP) .................................. 2022-188713

(51) Int. Cl.
*G01N 21/3504*   (2014.01)
*G01N 33/00*     (2006.01)
*G01N 21/17*     (2006.01)

(52) U.S. Cl.
CPC ..... *G01N 21/3504* (2013.01); *G01N 33/0027* (2013.01); *G01N 2021/1704* (2013.01);
(Continued)

(58) Field of Classification Search
CPC .............. G01N 21/35; G01N 21/3504; G01N 2021/1704; G01N 2201/1211;
(Continued)

(56) References Cited

U.S. PATENT DOCUMENTS 5,068,798 A     11/1991  Heath
5,332,901 A  *   7/1994  Eckles ............... G01N 21/3504
                                                    250/343
(Continued)

FOREIGN PATENT DOCUMENTS

EP        2657682 A1    10/2013
JP        S61223633 A   10/1986
(Continued)

OTHER PUBLICATIONS

An English translation of JP2017015516A by Patent Translate. (Year: 2024).*

*Primary Examiner* — Allen C. Ho

(57) ABSTRACT

Provided is a concentration measurement apparatus for measuring a concentration of a measurement object using an infrared ray, the concentration measurement apparatus including a signal acquisition unit configured to acquire a detection signal, a temperature information acquisition unit configured to acquire temperature information, a correction unit configured to output a correction signal obtained by correcting a temperature dependency of the detection signal based on the temperature information, and a calculation unit configured to calculate the concentration of the measurement object according to the correction signal using calibration curve data at a predetermined reference temperature for calculating the concentration of the measurement object, in which the correction unit is configured to output the correction signal obtained by performing linear correction of the detection signal using, among predetermined correction parameters different for three or more respective temperature segments, the correction parameter in a temperature segment corresponding to the temperature information.

19 Claims, 17 Drawing Sheets

(52) U.S. Cl.
CPC ............... *G01N 2201/1211* (2013.01); *G01N 2201/127* (2013.01); *G01N 2201/12746* (2013.01); *G01N 2201/12753* (2013.01)

(58) Field of Classification Search
CPC ... G01N 2201/127; G01N 2201/12746; G01N 2201/12753
USPC ........ 250/338.1, 339.11, 341.1, 341.5, 341.8
See application file for complete search history.

(56) References Cited

U.S. PATENT DOCUMENTS

| | | | |
|---|---|---|---|
| 5,452,234 A | 9/1995 | Heath | |
| 5,608,212 A | 3/1997 | Merilainen | |
| 7,071,470 B2* | 7/2006 | Nomura | G01N 21/3504 250/339.13 |
| 7,230,528 B2* | 6/2007 | Kates | G08B 25/10 340/539.2 |
| 7,336,168 B2* | 2/2008 | Kates | G08B 25/007 340/539.18 |
| 7,655,910 B2* | 2/2010 | Kajii | G01N 21/3518 250/343 |
| 7,733,049 B2* | 6/2010 | Hiramoto | B60S 1/0818 73/170.21 |
| 8,592,769 B2* | 11/2013 | Kusukame | G01N 21/359 250/341.6 |
| 8,624,189 B2* | 1/2014 | Inada | G01N 21/359 250/338.4 |
| 8,921,791 B2* | 12/2014 | Mataga | G01N 21/3504 250/338.3 |
| 9,030,329 B2* | 5/2015 | Rutherford | G08B 25/10 340/870.03 |
| 9,259,176 B2* | 2/2016 | Suzuki | G01J 3/28 |
| 9,310,295 B2* | 4/2016 | Tabaru | G01N 21/39 |
| 9,464,983 B2* | 10/2016 | Amano | A61B 5/14532 |
| 9,651,488 B2* | 5/2017 | Scherer | G01N 21/61 |
| 9,939,375 B2* | 4/2018 | Yasuda | G01N 21/3504 |
| 9,983,126 B2* | 5/2018 | Kotidis | G01N 21/39 |
| 10,241,038 B2* | 3/2019 | Nishimura | G01N 27/26 |
| 10,677,721 B2* | 6/2020 | Goda | G01N 21/274 |
| 10,702,187 B2* | 7/2020 | Jiang | G01N 21/3504 |
| 11,099,124 B2* | 8/2021 | Takahashi | G01N 21/274 |
| 11,131,625 B2* | 9/2021 | Avetisov | G01J 3/0205 |
| 11,360,020 B2* | 6/2022 | Takahashi | G01N 21/274 |
| 11,573,172 B2* | 2/2023 | Lannestedt | G01J 3/0237 |
| 11,686,671 B2* | 6/2023 | Nagase | G01N 33/0037 356/300 |
| 11,709,130 B2* | 7/2023 | Camargo | G01N 33/0027 250/252.1 |
| 2006/0173637 A1 | 8/2006 | Martin | |
| 2006/0273896 A1 | 12/2006 | Kates | |
| 2007/0063833 A1 | 3/2007 | Kates | |
| 2008/0030159 A1 | 2/2008 | Hiramoto | |
| 2011/0248857 A1 | 10/2011 | Rutherford | |
| 2011/0261359 A1 | 10/2011 | Inada | |
| 2012/0287418 A1 | 11/2012 | Scherer | |
| 2012/0312988 A1 | 12/2012 | Mataga | |
| 2014/0052003 A1 | 2/2014 | Jiang | |
| 2014/0067282 A1 | 3/2014 | Beyer | |
| 2016/0231239 A1 | 8/2016 | Kotidis | |
| 2019/0094134 A1 | 3/2019 | Solovyov | |
| 2019/0212261 A1 | 7/2019 | Lannestedt | |

FOREIGN PATENT DOCUMENTS

| | | |
|---|---|---|
| JP | H11304706 A | 11/1999 |
| JP | 2001221738 A | 8/2001 |
| JP | 2001235419 A | 8/2001 |
| JP | 2004309391 A | 11/2004 |
| JP | 2005315587 A | 11/2005 |
| JP | 2006153857 A | 6/2006 |
| JP | 2007003160 A | 1/2007 |
| JP | 2007102014 A | 4/2007 |
| JP | 2012073098 A | 4/2012 |
| JP | 2014074629 A | 4/2014 |
| JP | 2017015516 A | 1/2017 |
| WO | 2015119127 A1 | 8/2015 |

* cited by examiner

CONCENTRATION MEASUREMENT APPARATUS COMPRISING AN INFRARED EFFECT DETECTION UNIT, A TEMPERATURE MEASUREMENT UNIT, AND A SIGNAL PROCESSING UNIT, AND CONCENTRATION MEASUREMENT METHOD

The contents of the following Japanese patent application(s) are incorporated herein by reference:
NO. 2021-193604 filed in JP on Nov. 29, 2021 and
NO. 2022-188713 filed in JP on Nov. 25, 2022

BACKGROUND

1. Technical Field

The present invention relates to a concentration measurement apparatus and a concentration measurement method.

2. Related Art

Patent document 1 describes that "a gas sensor configured to highly precisely correct an influence from a deterioration of a light source is provided".

LIST OF CITED REFERENCES

Patent Documents

Patent Document 1: Japanese Patent Application Publication No. 2017-015516.
Patent Document 2: Japanese Translation Publication of a PCT Route Patent Application No. 2007-502407.

DESCRIPTION OF EXEMPLARY EMBODIMENTS

Hereinafter, the present invention will be described by way of embodiments of the invention, but the following embodiments are not intended to limit the invention according to the claims. In addition, not all combinations of features described in the embodiments are essential to the solution of the invention.

Figure 1:
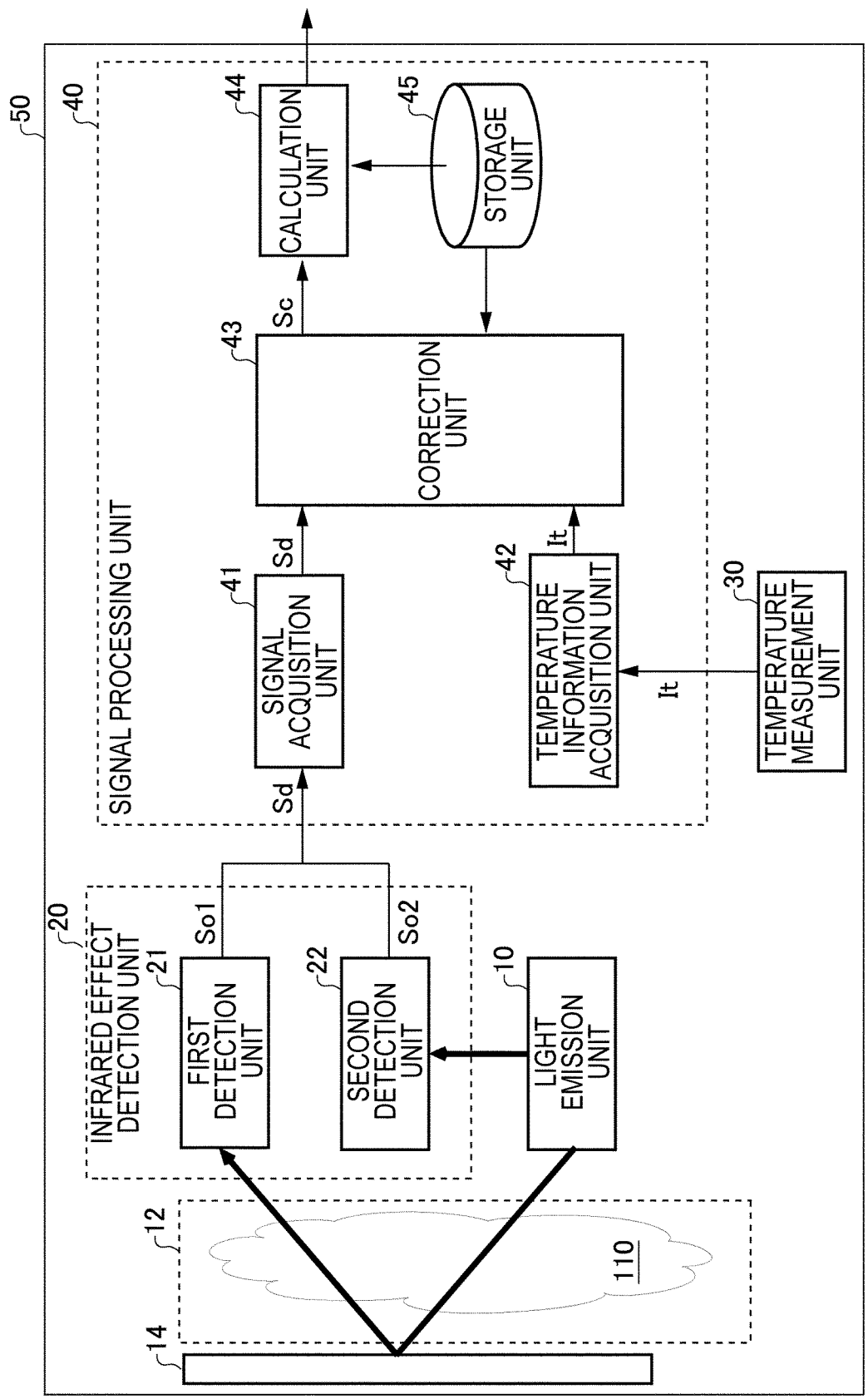
FIG. 1 illustrates an example of a configuration of a concentration measurement apparatus 100.

FIG. 1 illustrates an example of a configuration of a concentration measurement apparatus 100. The concentration measurement apparatus 100 includes a light emission unit 10, an infrared effect detection unit 20, a temperature measurement unit 30, and a signal processing unit 40. The concentration measurement apparatus 100 of the present example includes an optical path portion 12 and a reflection portion 14. The concentration measurement apparatus 100 is configured to measure a concentration of a measurement object 110 using an infrared ray.

The light emission unit 10 is configured to emit the infrared ray for measuring the concentration of the measurement object 110. To cause the infrared ray to pass through the measurement object 110 to calculate the concentration of the measurement object 110, the light emission unit 10 may emit the infrared ray with a fixed light quantity. The light emission unit 10 may be provided outside the concentration measurement apparatus 100.

The optical path portion 12 is an optical path for causing the infrared ray to pass through the measurement object 110. The optical path portion 12 includes the measurement object 110 and causes the infrared ray to pass through the measurement object 110 at a predetermined optical path length. The optical path portion 12 may be a container for holding the measurement object 110 in a closed space, or may be a flow path for causing the measurement object 110 to flow. An infrared ray reflected by the reflection portion 14 may pass through the optical path portion 12.

The measurement object 110 is a material through which the infrared ray emitted by the light emission unit 10 transmits for measuring a concentration. The measurement object 110 may be a gaseous matter or may be a liquid matter. For example, the measurement object 110 is carbon dioxide gas, but is not limited to this. The measurement object 110 is provided in the optical path portion 12 through which the infrared ray passes.

The infrared effect detection unit 20 is configured to detect an effect on the measurement object 110 which is caused by the infrared rays emitted by the light emission unit 10, and output a detection signal Sd. The infrared effect detection unit 20 may have an infrared sensor configured to detect an infrared ray. The infrared effect detection unit 20 may have a quantum well type sensor configured to detect an infrared ray. In a case where the measurement object 110 is a gaseous matter, the infrared effect detection unit 20 may have a microphone configured to detect a pressure variation (sound wave) of the measurement object 110 which is caused when motion energy varies since the measurement object 110 absorbs an infrared ray. That is, the infrared effect detection unit 20 may have a microphone configured to detect an acoustic wave by a photoacoustic effect of the measurement object 110.

The infrared effect detection unit 20 of the present example has a first detection unit 21 and a second detection unit 22. Each of the first detection unit 21 and the second detection unit 22 of the present example has an infrared sensor configured to detect the infrared ray emitted by the light emission unit 10. Each of the first detection unit 21 and the second detection unit 22 may be a quantum well type sensor. The first detection unit 21 and the second detection unit 22 are not limited to this, and the first detection unit 21 and/or the second detection unit 22 may have a microphone. Detection mechanisms of the first detection unit 21 and the second detection unit 22 may be the same, or may be different from each other. Hereinafter, a case will be described where the first detection unit 21 and the second detection unit 22 are infrared sensors.

The first detection unit 21 is configured to output a first output signal So1 obtained by detecting the infrared ray that has passed through the measurement object 110. That is, a light quantity of the infrared ray incident on the first detection unit 21 varies according to a concentration of the measurement object 110 or the like. For example, the light quantity of the infrared ray incident on the first detection unit 21 varies according to a Lambert-Beer law. The first detection unit 21 of the present example detects the infrared ray reflected by the reflection portion 14. That is, the first detection unit 21 detects the infrared ray which has passed through the measurement object 110, been reflected by the reflection portion 14 and then passed through the measurement object 110 again. It is noted however that the first detection unit 21 may detect the infrared ray emitted by the light emission unit 10 without being reflected by the reflection portion 14.

The second detection unit 22 is configured to output a second output signal So2 obtained by detecting the infrared ray that have not passed through the measurement object 110. That is, the second detection unit 22 detects the infrared ray at a fixed light quantity without being affected by the concentration of the measurement object 110. The second detection unit 22 may detect the infrared ray emitted by the light emission unit 10 without being reflected by the reflection portion 14. A resistance value of the first detection unit 21 may be set as the second output signal So2. A resistance value of the second detection unit 22 may be set as the second output signal So2. A forward voltage of the light emission unit 10 may be set as the second output signal So2. The second output signal So2 is not affected by the concentration of the measurement object 110.

The detection signal Sd is a signal based on the first output signal So1 and the second output signal So2. The detection signal Sd may include each of the first output signal So1 and the second output signal So2. The detection signal Sd may include a signal ratio of the first output signal So1 to the second output signal So2. A concentration variation of the measurement object 110 can be detected by comparing the first output signal So1 and the second output signal So2 which are output by the infrared effect detection unit 20 with each other.

An infrared sensor of the infrared effect detection unit 20 may be a pyroelectric sensor or may be a quantum well type sensor. At least one of the first detection unit 21 or the second detection unit 22 may be a quantum well type sensor. By using the quantum well type sensor, the infrared effect detection unit 20 can achieve a faster response as compared with that of the pyroelectric sensor. In addition, since the quantum well type sensor can measure a signal absolute value, a simple signal process can be achieved.

Note that after the infrared ray is emitted from a common light emission element, by branching the optical path, the light emission unit 10 may cause the first detection unit 21 and the second detection unit 22 to detect infrared rays, respectively, at different optical paths. In addition, by emitting a plurality of infrared rays from different light emission elements, the light emission unit 10 may cause the first detection unit 21 and the second detection unit 22 to detect the infrared rays, respectively, at different optical paths.

The temperature measurement unit 30 is configured to measure a temperature using any temperature sensor. The temperature measurement unit 30 of the present example measures a temperature at any position of the concentration measurement apparatus 100. For example, the temperature measurement unit 30 measures a temperature of the light emission unit 10, the infrared effect detection unit 20, or, the signal processing unit 40. The temperature measurement unit 30 may measure a temperature of the measurement object 110.

In an example, the temperature measurement unit 30 measures the temperature of the infrared effect detection unit 20 using the second detection unit 22. The temperature measurement unit 30 may measure a temperature of the second detection unit 22 based on the second output signal So2. Specifically, the temperature measurement unit 30 may measure the temperature of the second detection unit 22 based on an infrared ray signal value of the second detection unit 22. Specifically, the temperature measurement unit 30 may measure the temperature of the second detection unit 22 based on a resistance value of the second detection unit 22. When a temperature dependency of the second output signal So2 is measured in advance, the second output signal So2 can be utilized as a thermometer. Note that the temperature dependency of the second output signal So2 may be stored in a storage unit 45 described below.

Herein, a temperature characteristic affecting the concentration calculation may be generated in the light emission unit 10 or the infrared effect detection unit 20. In addition, when a light absorption characteristic of the measurement object 110 varies depending on a temperature, the concentration calculation may be affected. Therefore, when correction is performed based on these temperatures, it is facilitated for the concentration measurement apparatus 100 to more highly precisely calculate the concentration of the measurement object 110.

The signal processing unit 40 has a signal acquisition unit 41, a temperature information acquisition unit 42, a correction unit 43, a calculation unit 44, and the storage unit 45. The signal processing unit 40 may be constituted by a microcomputer.

The signal acquisition unit 41 is configured to acquire the detection signal Sd from the infrared effect detection unit 20. The signal acquisition unit 41 inputs the detection signal Sd to the correction unit 43. The signal acquisition unit 41 may acquire the detection signal Sd from the infrared effect detection unit 20 provided outside the concentration measurement apparatus 100. The signal acquisition unit 41 may acquire each of the first output signal So1 and the second output signal So2 as the detection signal Sd, or may acquire a signal ratio of the first output signal So1 to the second output signal So2. The signal acquisition unit 41 may acquire each of the first output signal So1 and the second output signal So2 to generate the signal ratio of the first output signal So1 to the second output signal So2.

The temperature information acquisition unit 42 is configured to acquire temperature information It measured by the temperature measurement unit 30. The temperature information It may include a temperature of the measurement object 110. The temperature information It may include a temperature of the light emission unit 10, the infrared effect detection unit 20, or the signal processing unit 40. The temperature information acquisition unit 42 may acquire the temperature information It from the temperature measurement unit 30 provided outside the concentration measurement apparatus 100.

The correction unit 43 is configured to output a correction signal Sc obtained by correcting a temperature dependency of the detection signal Sd. The correction unit 43 generates the correction signal Sc based on the detection signal Sd and the temperature information It. The correction unit 43 of the present example performs linear correction of the detection signal Sd for each of three or more temperature segments using predetermined correction parameters. The correction unit 43 may perform linear correction of the temperature dependency of the detection signal Sd using the correction parameters different for each temperature segment. The correction parameters will be described below.

The calculation unit 44 is configured to calculate a concentration of the measurement object 110 according to the correction signal Sc using calibration curve data at a predetermined reference temperature for calculating the concentration of the measurement object 110. For example, the calculation unit 44 calculates the concentration of the measurement object 110 using common calibration curve data at a reference temperature (25° C.) by correcting the detection signal Sd at any measurement temperature Tm to be applied to the calibration curve data. Therefore, it is not necessary to change the calibration curve data according to the measurement temperature Tm. The calibration curve data will be described below. The calculation unit 44 may output the calculated concentration of the measurement object 110 to the outside of the concentration measurement apparatus 100.

The storage unit 45 is configured to store information required to calculate the concentration of the measurement object 110. The storage unit 45 of the present example stores information such as the correction parameters used for the correction of the detection signal Sd in the correction unit 43. The storage unit 45 may store the calibration curve data for calculating the concentration of the measurement object 110 by the calculation unit 44.

The storage unit 45 of the present example stores the correction parameters different for each of three or more temperature segments. The storage unit 45 may store the temperature segments and the correction parameters in a tabulated form. The storage unit 45 may store function parameters used for the linear correction for each of temperature segments T1 to Tn.

The concentration measurement apparatus 100 is housed in a single housing 50. That is, the concentration measurement apparatus 100 is put into a single package by the housing 50. The concentration measurement apparatus 100 of the present example is put into the single package by including the light emission unit 10, the optical path portion 12, the reflection portion 14, the infrared effect detection unit 20, and the temperature measurement unit 30 in addition to the signal processing unit 40, but any component may be provided outside the housing 50. That is, the concentration measurement apparatus 100 may acquire the detection signal Sd and the temperature information It which are measured outside the housing 50 to calculate the concentration of the measurement object 110.

Here, absorption of the infrared ray by the measurement object 110 will be described using the Lambert-Beer law. In the present example, a description will be provided using gas as the measurement object 110, but is not limited to this. A light absorption quantity Abs of the infrared ray by gas is represented by the following expression.

$$Abs = l_0 - l_0 \times e^{-k \times l \times c}$$

$l_0$ denotes an ideal light absorption quantity without an effect from gas. In addition, k denotes an absorption coefficient depending on gas, l denotes an optical path length, and c denotes a gas concentration. An absorbance AR is represented by the following expression.

$$AR = 1 - e^{-k \times l \times c}$$

When correction parameters of zero correction and span correction have a temperature characteristic coefficient, each correction parameter is represented by the following expression. Note that the zero correction and the span correction will be described below.

$$\text{Correction parameter Zero}(T) = \text{Zero} \times fz(T).$$

$$\text{Correction parameter Span}(T) = \text{Span} \times fs(T).$$

In this case, a light absorption signal Signal_Abs is represented by the following expression.

$$\text{Signal\_Abs} = \text{Span}(T) \times (1 - \text{Zero}(T) \times So1/So2)$$

An arrival light quantity is represented by the following expression.

$$l_0 - Abs = l_0 - (l_0 - l_0 \times e^{-k \times k \times c})$$

Then, an arrival light quantity signal Signal is represented by the following expression.

$$\text{Signal} = 1 - (1 - So1/So2) \times \text{Zero}(T)) \times \text{Span}(T)$$

In this manner, by acquiring a signal according to the concentration of the measurement object 110, the concentration measurement apparatus 100 can calculate the concentration of the measurement object 110.

Figure 2A:
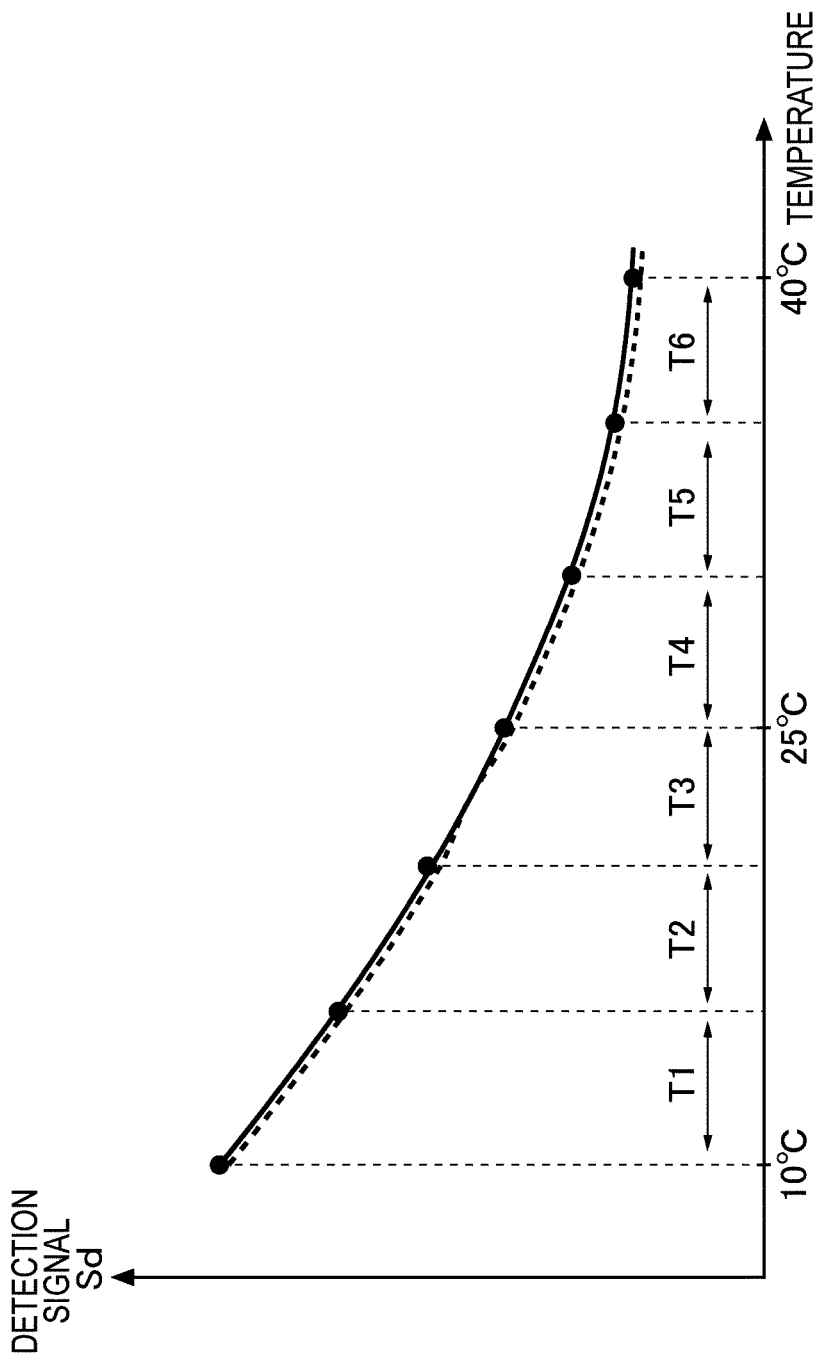
FIG. 2A illustrates an example of a temperature characteristic of a detection signal Sd.

FIG. 2A illustrates an example of a temperature characteristic of the detection signal Sd. A vertical axis represents a signal strength of the detection signal Sd, and a horizontal axis represents a temperature. In the present example, the linear correction is performed with six divided temperature segments T1 to T6 at every 5° C. from 10° C. to 40° C. Correction temperature points of the present example are 10° C., 15° C., 20° C., 25° C., 30° C., 35° C., and 40° C. The correction temperature point is a point serving as a reference of the linear correction, at which an error between the detection signal Sd and a correction parameter is minimized.

As an example, the correction signal Sc may be a signal in which the temperature characteristic is substantially flattened which is acquired by dividing the detection signal Sd by the correction parameter. Herein, the phrase "the temperature characteristic is substantially flattened" means that the signal varies little by a variation of temperature.

Figure 2B:
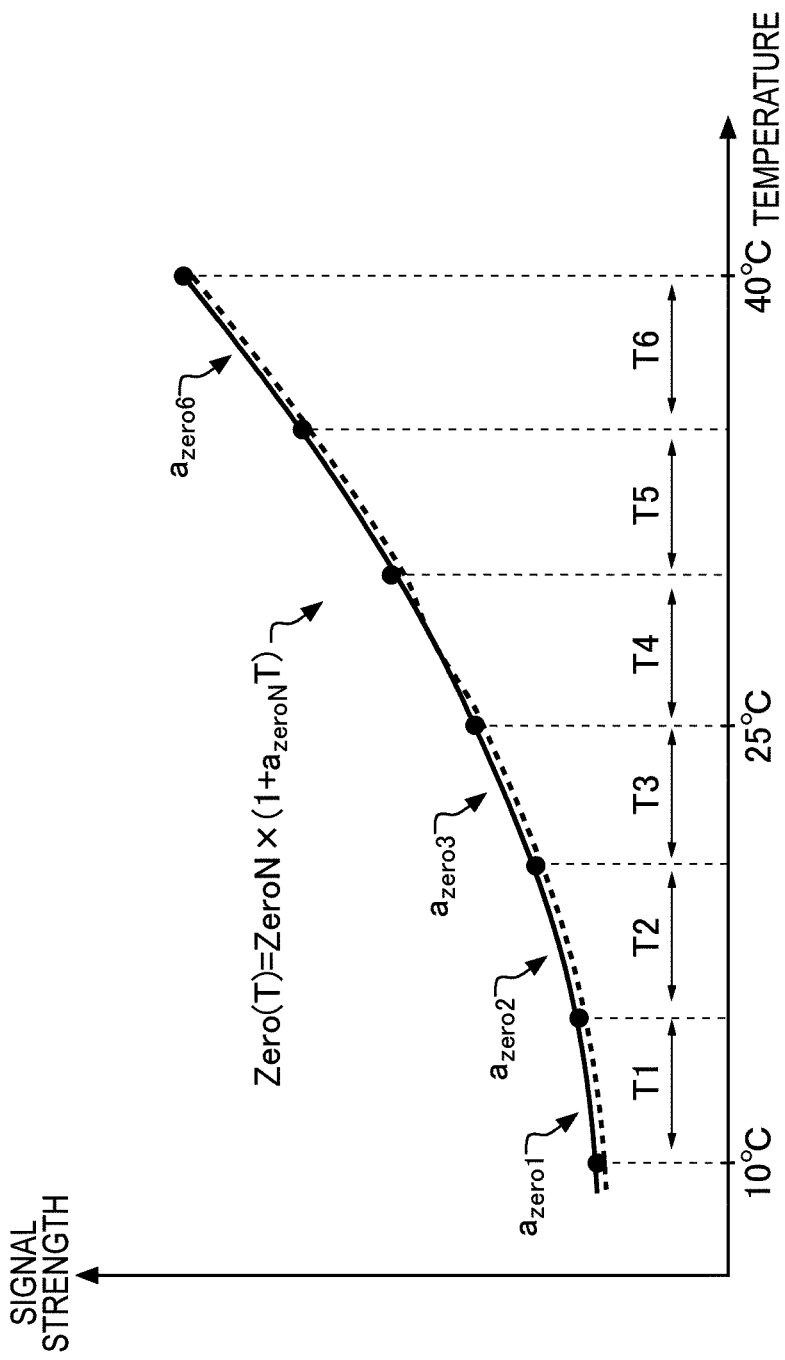
FIG. 2B illustrates an example of a temperature characteristic of a correction parameter Zero(T).

FIG. 2B illustrates an example of a temperature characteristic of the correction parameter Zero(T). A vertical axis represents a signal strength, and a horizontal axis represents a temperature. The correction parameter Zero(T) may be a function obtained such that the correction signal Sc is substantially flattened. That is, the correction parameter Zero(T) may be a function to be a reciprocal of the detection signal Sd. In the present example, the linear correction is performed with six divided temperature segments T1 to T6 at every 5° C. from 10° C. to 40° C. Correction temperature points of the present example are 10° C., 15° C., 20° C., 25° C., 30° C., 35° C., and 40° C. The correction temperature point is a point serving as a reference of the linear correction, at which the temperature characteristic of the correction signal Sc is processed to be substantially flattened. That is, a value obtained by multiplying the detection signal Sd by the correction parameter Zero(T) at the correction temperature point may become 1. The correction parameter Zero(T) may be obtained by performing linear interpolation of a function to be a reciprocal of the temperature characteristic of the detection signal Sd. Herein, the linear interpolation means obtaining a parameter by performing fitting between correction points of the function. The linear correction means substantially flattening the temperature characteristic of the correction signal using the correction parameter. Therefore, the linear correction and the linear interpolation may be different concepts.

As described above, the correction signal Sc may be a signal which has been substantially flattened by multiplying or dividing the detection signal Sd by the correction parameter Zero(T). In the example of FIG. 2A, the detection signal Sd is divided by the correction parameter Zero(T) to substantially flatten the correction signal Sc, and in the example of FIG. 2B, the detection signal Sd is multiplied by the correction parameter Zero(T) to substantially flatten the correction signal Sc. That is, the linear correction may be correcting the detection signal Sd using the correction parameter which is a linear function of temperature.

The correction signal Sc may be the light absorption signal Signal_Abs, or may be the arrival light quantity signal Signal. It is sufficient when the correction signal Sc is a signal varying according to the concentration of the measurement object 110. The correction signal Sc of the present example is the light absorption signal Signal_Abs.

The concentration measurement apparatus 100 of the present example sets a correction parameter Zero(T) for each temperature segment. The correction parameter of the present example is used for the zero correction, but may correct a temperature characteristic using other correction parameters of the span correction or the like.

The correction parameter Zero(T) of the present example is represented by the following expression.

$$\text{Zero}(T) = \text{Zero}N \times (1 + a_{zeroN}T)$$

The coefficient ZeroN and the coefficient $a_{zeroN}$ may be different values for each temperature segment. With regard to the coefficient $a_{zeroN}$ of the present example, $a_{zero1}$ to $a_{zero6}$ are respectively set in the temperature segments T1 to T6. That is, the correction parameter Zero(T) may be a value different for each temperature segment.

As a modified example, when the temperature characteristic is corrected by using the correction parameter Span(T) of the span correction, the correction parameter Span(T) is represented by the following expression.

$$\text{Span}(T) = \text{Span}N \times (1 + a_{spanN}T).$$

A coefficient SpanN and a coefficient $a_{spanN}$ may be different values for each temperature segment. That is, the correction parameter Span(T) may be a value different for each temperature segment.

The concentration measurement apparatus 100 of the present example performs the linear correction for each of three or more temperature segments using the correction parameter different for each temperature segment. That is, the correction parameter may be different for each temperature segment. As a result, the concentration measurement apparatus 100 can also highly precisely approximate a temperature characteristic curve for the three or more temperature segments. Then, by performing the linear correction for each of the three or more temperature segments, as compared with a case where a polynomial is used, overfitting by the approximation is less likely to occur. In addition, in the linear correction, the number of times to perform multiplication is decreased as compared with a case where the polynomial is used, and it is possible to reduce a computation cost.

Figure 2C:
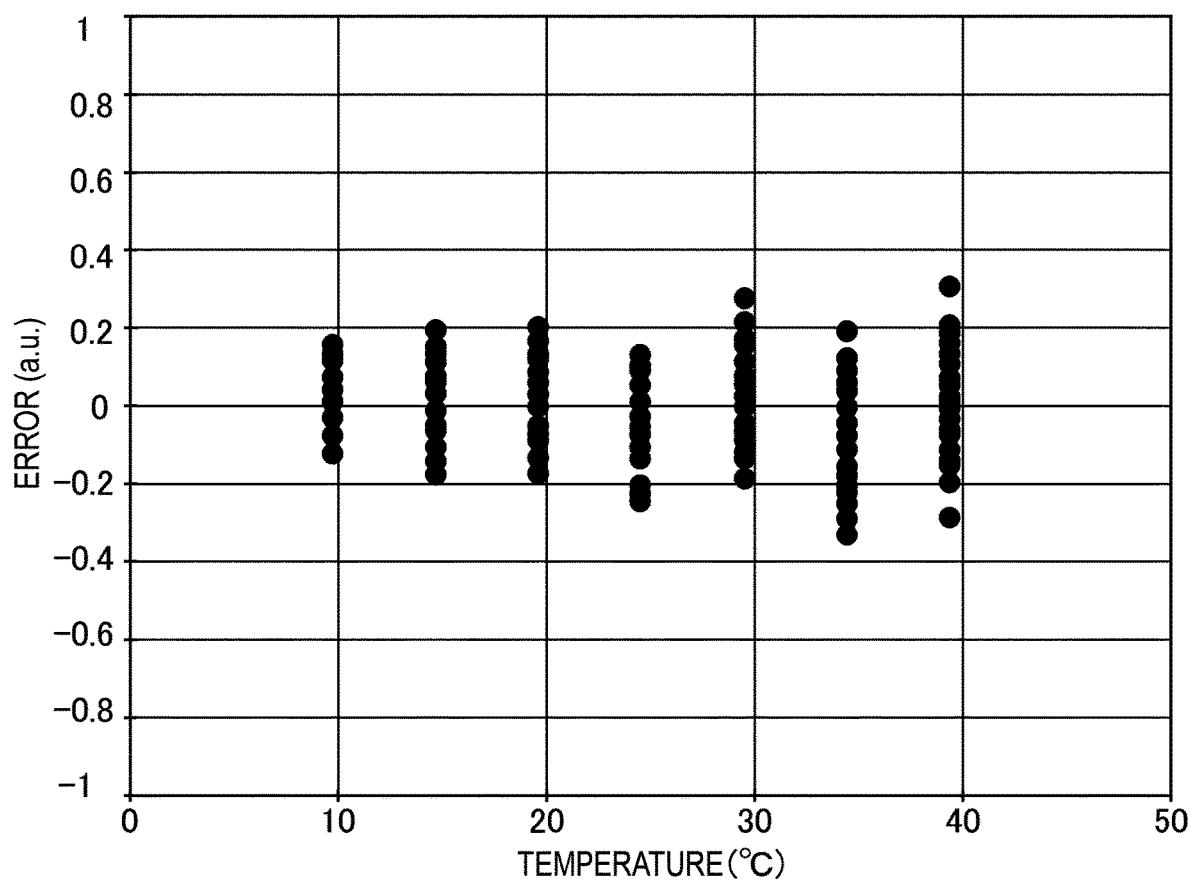
FIG. 2C is an example of a graph representing a temperature dependency of an error of a signal obtained by converting the correction signal Sc into a concentration.

FIG. 2C is an example of a graph representing a temperature dependency of an error of a signal obtained by converting the correction signal Sc into a concentration. An error on a vertical axis represents an error of a signal obtained by converting the correction signal Sc for the concentration of the measurement object 110 into a concentration. A plurality of plots at each temperature represent simulation results of different temperature characteristic samples. By performing the linear correction of the detection signal Sd for each of the three or more temperature segments, the concentration measurement apparatus 100 of the present example reduces a wavelike error at temperatures other than correction temperature points which will be described below. In the present example, the error is controlled within ±0.4 in a range from 10° C. to 40° C. In this manner, while the computation cost is suppressed, the concentration measurement apparatus 100 can more highly precisely correct the detection signal Sd.

Figure 2D:
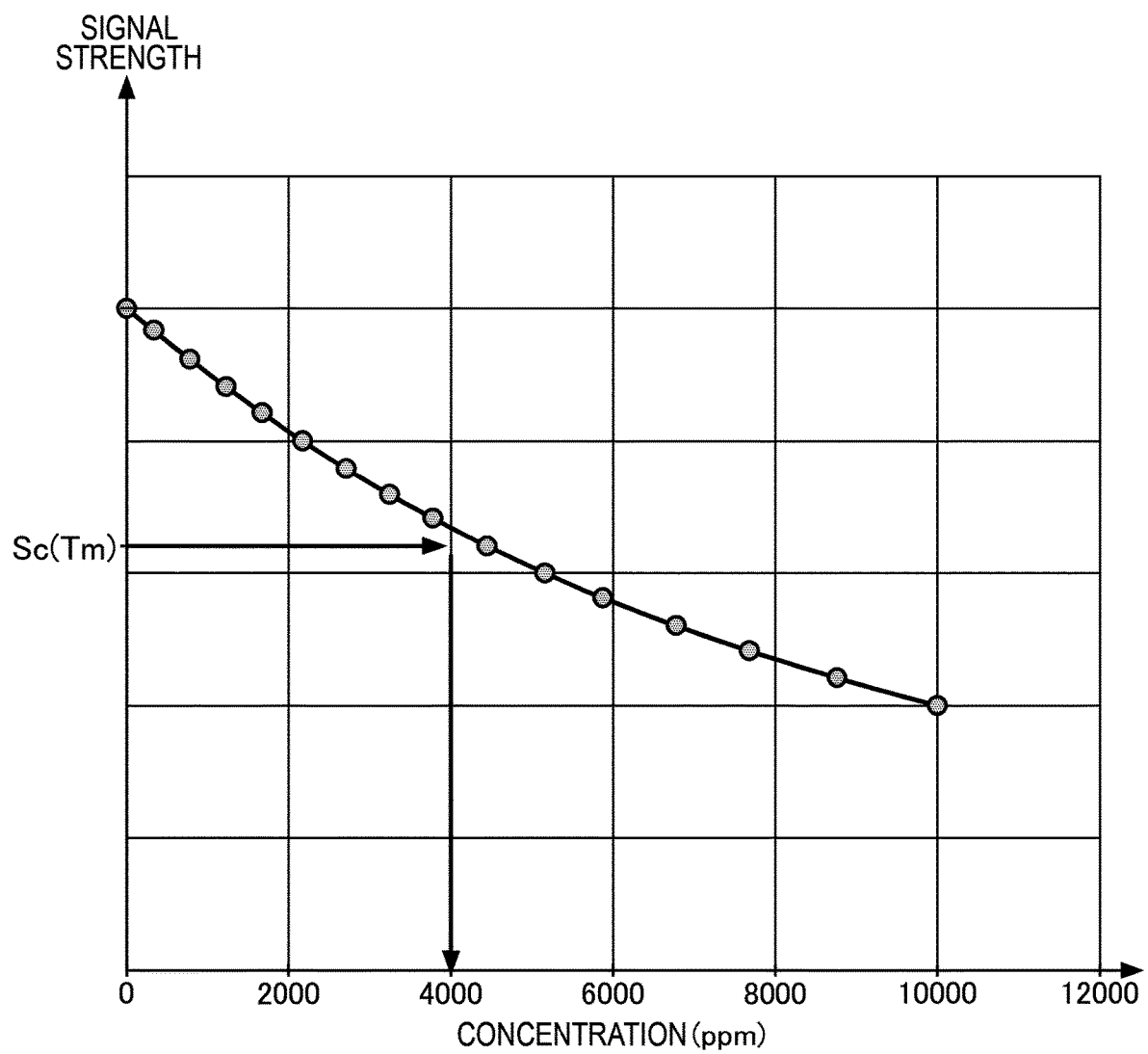
FIG. 2D illustrates an example of a calculation method of a concentration of a measurement object 110 using calibration curve data.

FIG. 2D illustrates an example of a calculation method of the concentration of the measurement object 110 using the calibration curve data. The calibration curve data of the present example is data at a predetermined reference temperature (for example, 25° C.). By generating the correction signal Sc(Tm) at the measurement temperature Tm, the concentration measurement apparatus 100 can calculate the concentration of the measurement object 110 using the common calibration curve data. That is, even when the reference temperature and the measurement temperature Tm are different from each other, by acquiring the correction signal Sc by correcting the measurement signal Sd, the concentration of the measurement object 110 can be calculated by using the calibration curve data at the reference temperature. For the calibration curve data, it is sufficient when one piece of calibration curve data at the predetermined reference temperature is acquired.

Figure 3A:
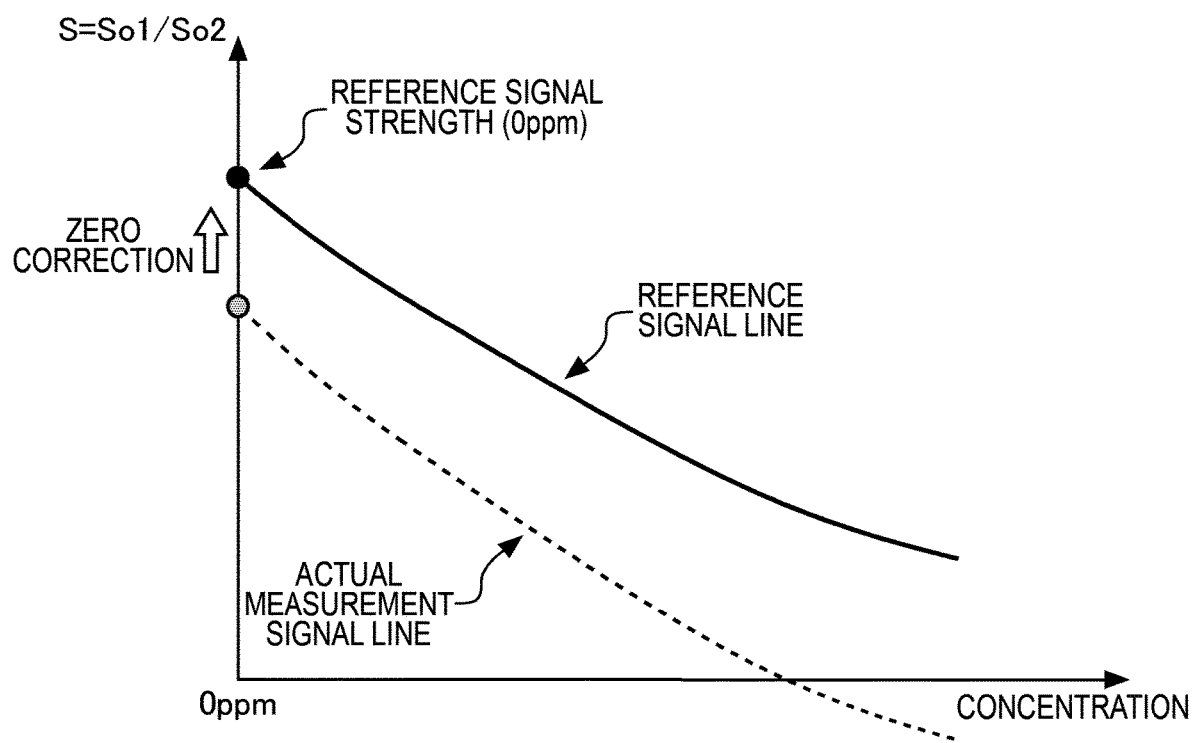
FIG. 3A illustrates a method of correcting a measurement error by zero correction.

FIG. 3A illustrates a method of correcting a measurement error by the zero correction. A solid line is a reference signal line representing a concentration dependency of a measurement signal. A dashed line is an actual measurement signal line representing a concentration dependency of the measurement signal. For example, the actual measurement signal line is moved to perform correction such that an actual measurement signal strength is to be matched to a reference signal strength at a concentration of 0 ppm. Furthermore, the above described correction may be performed by also including the correction of the temperature characteristic. In the present example, the actual measurement signal line of a signal strength ratio S=So1/So2 is corrected, but a type of the signal to be corrected is not limited to this.

Note that, in the present example, the actual measurement signal line is matched to the reference signal line using the signal strength at which the concentration of the measurement object 110 is 0 ppm, but a concentration other than 0 ppm may be set as the reference for performing the correction. For example, when the measurement object 110 is carbon dioxide gas, the correction may be performed using a signal strength at 400 ppm.

Figure 3B:
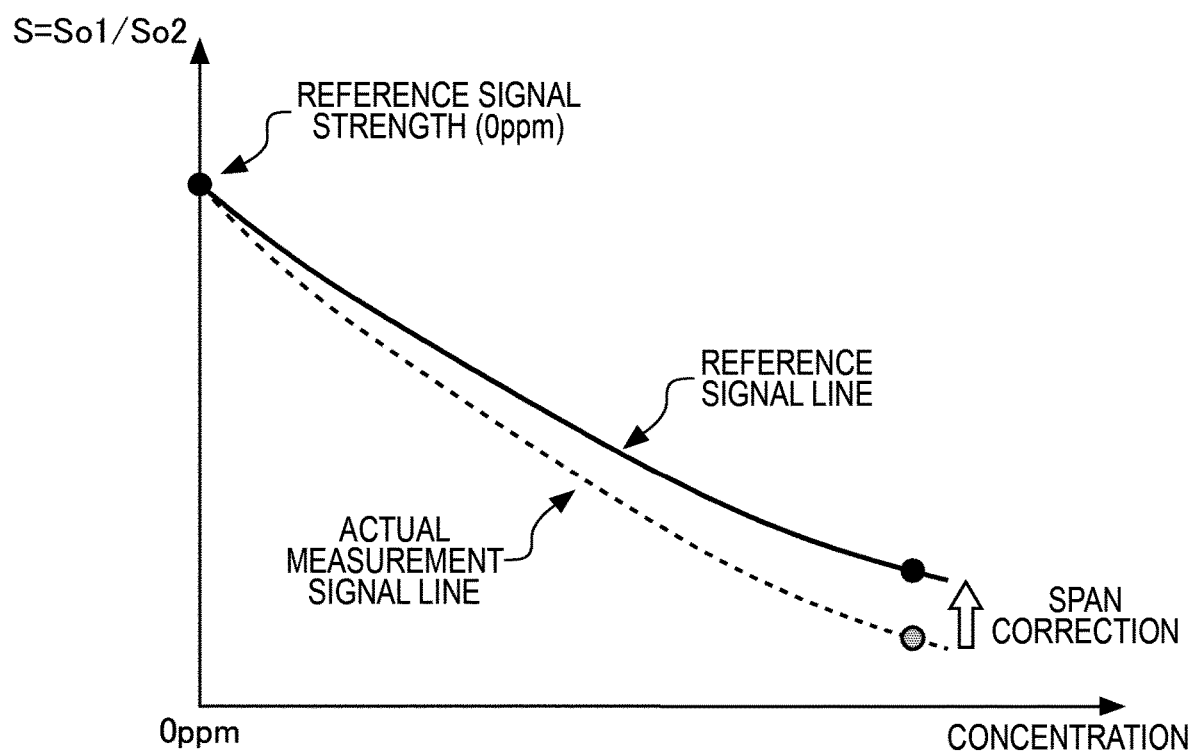
FIG. 3B illustrates a method of correcting the measurement error by span correction.

FIG. 3B illustrates a method of correcting the measurement error by the span correction. In the span correction, a gradient of the actual measurement signal line represented by the dashed line is adjusted to perform correction such that a difference from the reference signal line in a measurement concentration range falls within a predetermined range. Furthermore, the above described correction may be performed by also including the correction of the temperature characteristic. In the present example, the correction is performed such that a strength variation of the actual measurement signal line in a measurement concentration range from a predetermined gas concentration (for example, 0 ppm) falls within a predetermined reference output range. The reference output range may be an output range of the reference signal line, may be determined based on the calibration curve data at the predetermined reference temperature, and may fall within a variation range of the calibration curve data.

The concentration measurement apparatus 100 may correct the temperature characteristic using any one of methods of the zero correction and the span correction, or may correct the temperature characteristic using both. The concentration measurement apparatus 100 may set the correction parameter of the method to be used for each of the three or more temperature segments.

The concentration measurement apparatus 100 may further perform correction of the temperature characteristic in addition to the zero correction and/or the span correction. For example, when the detection signal Sd is signal ratio of the first output signal So1 to the second output signal So2, before the zero correction and/or the span correction is performed on the detection signal Sd, correction of the temperature characteristic may be performed on the first output signal So1 and/or the second output signal So2. The correction of the temperature characteristic on the first output signal So1 and/or the second output signal So2 may be performed by using the correction parameter set for each of three or more temperature segments, and may be correction that is similar to the correction of the detection signal Sd described above. The temperature characteristic can be further improved by the application of the further correction of the temperature characteristic.

Figure 4A:
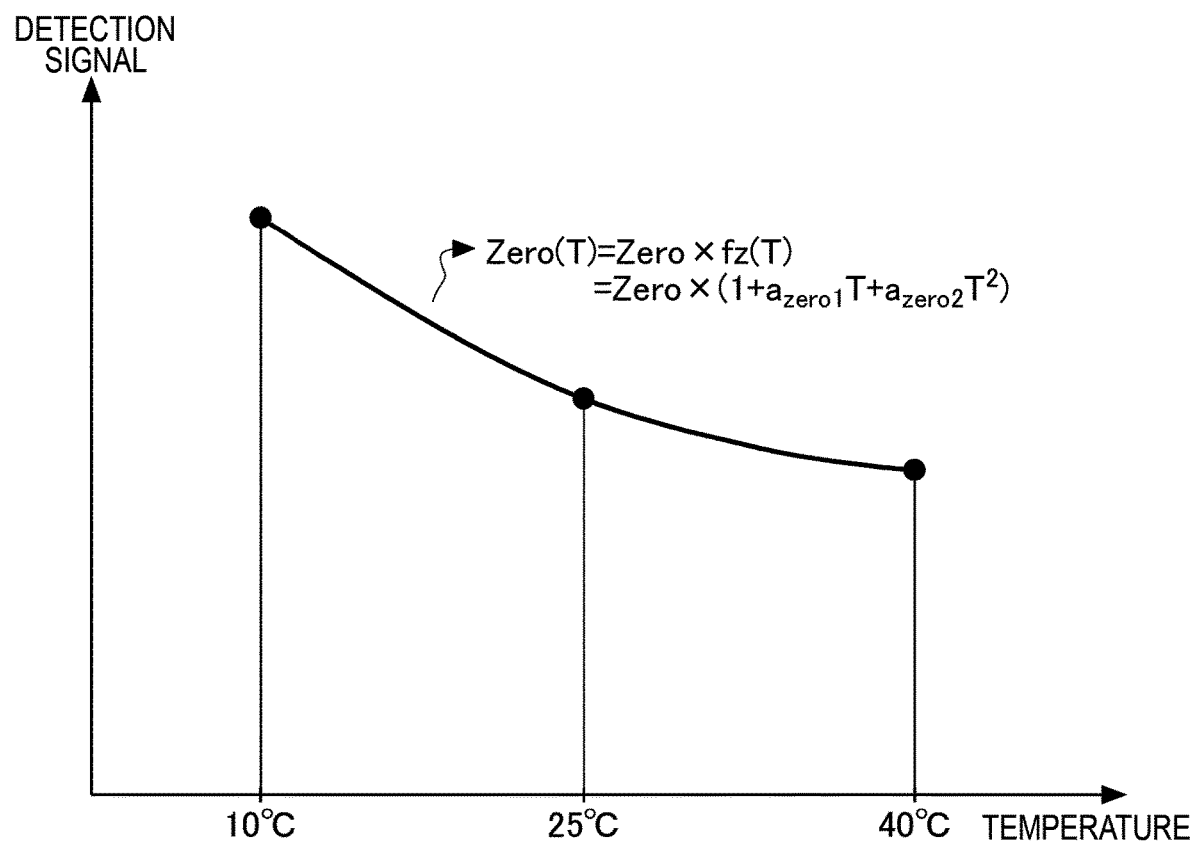
FIG. 4A illustrates a comparative example of the temperature characteristic of the detection signal when three correction temperature points are corrected by a quadratic polynomial.

FIG. 4A illustrates a comparative example of the temperature characteristic of the detection signal when three correction temperature points are corrected by the quadratic polynomial. In the present example, the correction is performed by the quadratic polynomial using correction temperature points at 10° C., 25° C., and 40° C. The correction parameter Zero(T) used in each temperature segment is represented by the following expression.

Correction parameter Zero $(T) = \text{Zero} \times fz(T)$.

$$= \text{Zero} \times \left(1 + a_{zero1}T + a_{zero2}T^2\right)$$

Zero, $a_{zero1}$, and $a_{zero2}$ may be any correction coefficient.

Figure 4B:
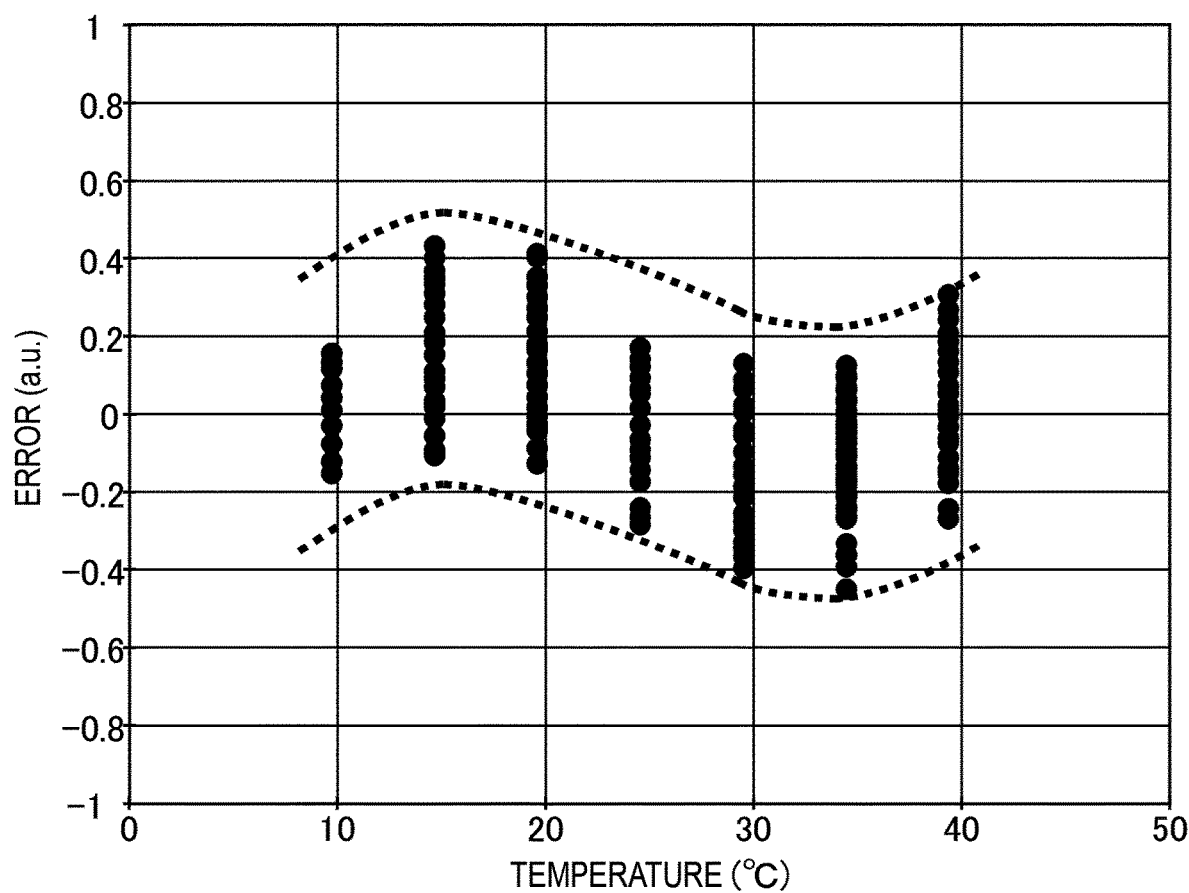
FIG. 4B illustrates a comparative example of an error of the correction signal when the three correction temperature points are corrected by the quadratic polynomial.

FIG. 4B illustrates a comparative example of the error of the correction signal when three correction temperature points are corrected by a quadratic polynomial. An error on a vertical axis represents an error of the correction signal for the concentration of the measurement object 110. A correction condition and correction temperature points are the same as those of the example in FIG. 4A. When the correction is performed by the quadratic polynomial, a wavelike error at temperatures other than the correction temperature points may be generated as in the present example. In the present example, the error is within ±0.5 in a range from 10° C. to 40° C.

Figure 5A:
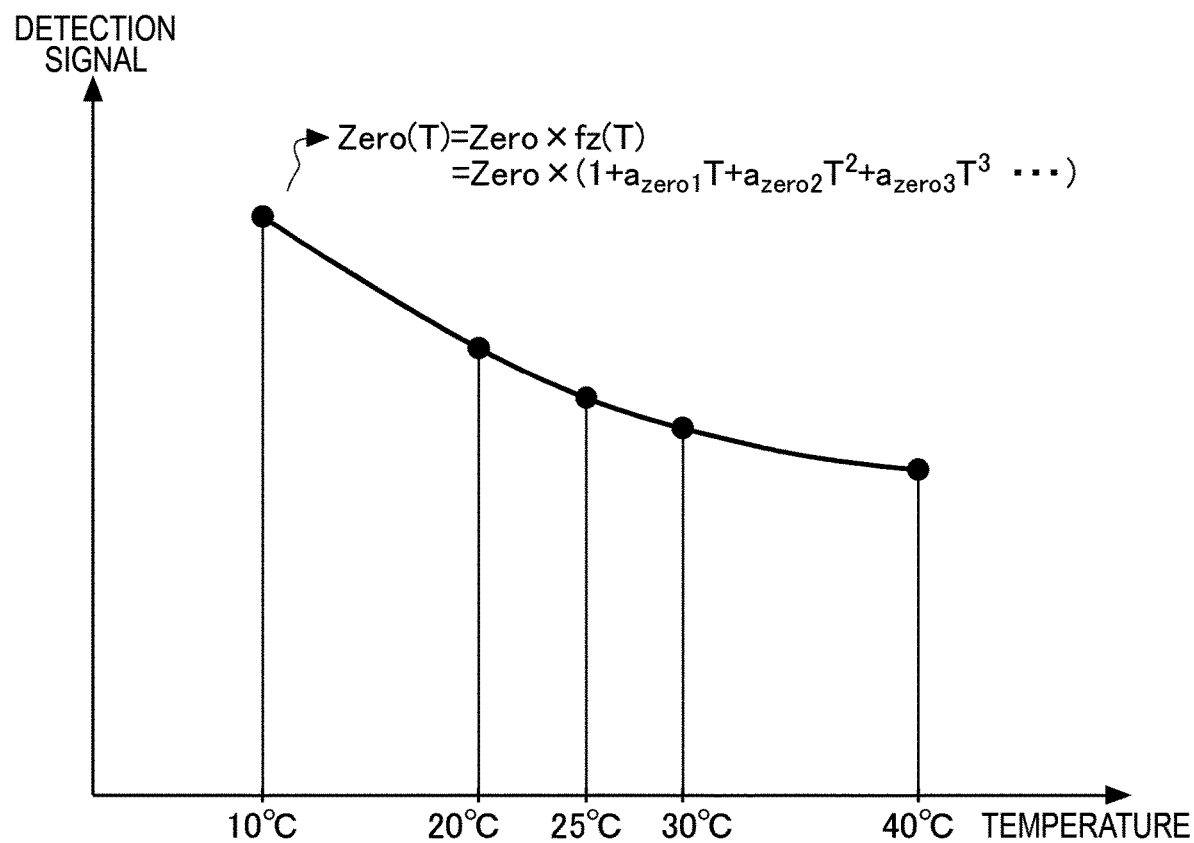
FIG. 5A illustrates a comparative example of the temperature characteristic of the detection signal when four or more correction temperature points are corrected by a polynomial of a third degree or higher.

FIG. 5A illustrates a comparative example of the temperature characteristic of the detection signal when four or more correction temperature points are corrected by a polynomial of a third degree or higher. In the present example, the correction is performed by a polynomial of a fourth degree using five correction temperature points at 10° C., 20° C., 25° C., 30° C., and 40° C. The correction parameter Zero(T) used in each temperature segment is represented by the following expression.

Correction parameter Zero$(T)$=Zero$\times fz(T)$.

$$=\text{Zero} \times (1+a_{zero1}T+a_{zero2}T^2+a_{zero3}T^3)$$

Figure 5B:
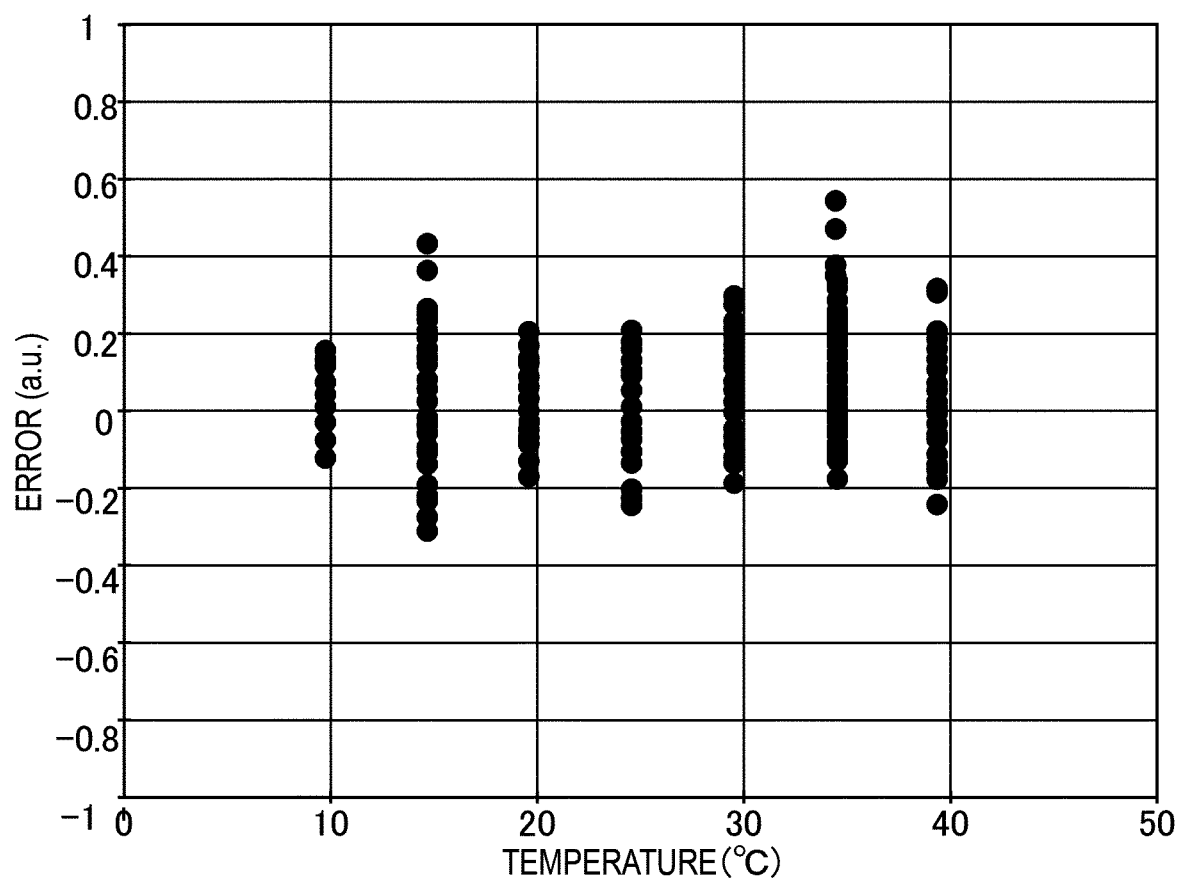
FIG. 5B illustrates a comparative example of the error of the correction signal when four or more correction temperature points are corrected by the polynomial of the third degree or higher.

FIG. 5B illustrates a comparative example of the error of the correction signal when four or more correction temperature points are corrected by a polynomial of the third degree or higher. A correction condition and correction temperature points are the same as those of the example in FIG. 5A. Even when the number of correction temperature points is increased and the correction is performed by a polynomial of the third degree or higher, a wavelike error at temperatures other than the correction temperature points may be generated as in the present example. In addition, when a polynomial of the third degree or higher is used, the wavelike error at the temperatures other than the correction temperature points is more likely to be generated as compared with a case where a quadratic polynomial is used. In the present example, in a range from 10° C. to 40° C., the error is ±0.5 or more, and the error is increased as compared with a case where a quadratic polynomial is used.

Figure 6:
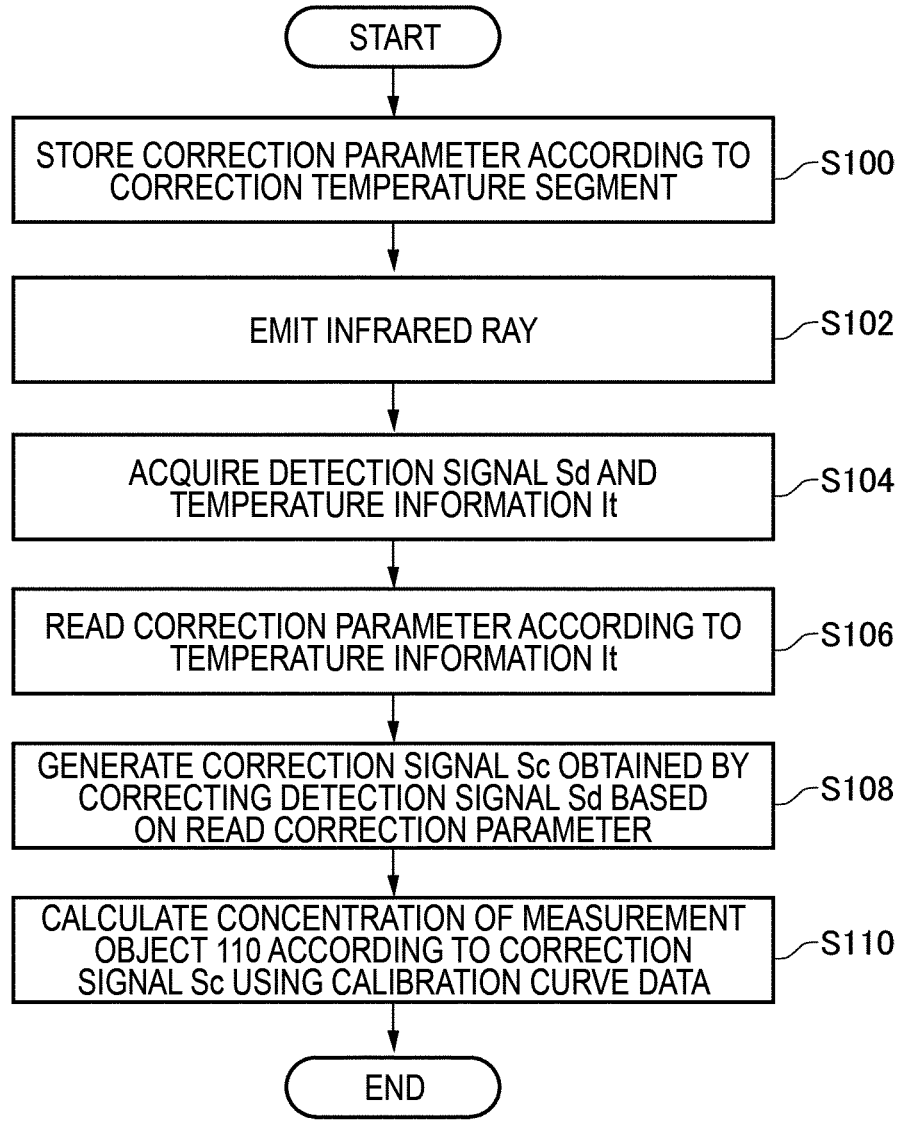
FIG. 6 illustrates an example of an operational flow chart of the concentration measurement apparatus 100.

FIG. 6 illustrates an example of an operational flow chart of the concentration measurement apparatus 100. In step S100, a correction parameter according to a correction temperature segment is stored. In step S102, an infrared ray is emitted. The infrared ray may pass through the measurement object 110 to be detected by the first detection unit 21, or may be detected by the second detection unit 22 without passing through the measurement object 110. In step S104, the detection signal Sd and the temperature information It are acquired. In step S106, a correction parameter according to the temperature information It is read. In step S108, the correction signal Sc obtained by correcting the detection signal Sd based on the read correction parameter is generated. In step S110, a concentration of the measurement object 110 according to the correction signal Sc is calculated using the calibration curve data at the predetermined reference temperature. The concentration measurement apparatus 100 may output the calculated concentration of the measurement object 110 to the outside.

In step S108, the concentration measurement apparatus 100 of the present example performs the linear correction of the detection signal Sd for each of the three or more temperature segments using the predetermined correction parameter. That is, in step S110, the linear correction is performed before the calculation of the concentration of the measurement object 110 using the calibration curve data. Therefore, it is not necessary to correct the temperature dependency of the calibration curve data in the concentration measurement apparatus 100. That is, it is sufficient when one piece of calibration curve data at the predetermined reference temperature is prepared, and it is not necessary for the concentration measurement apparatus 100 of the present example to prepare different calibration curve data for each temperature.

Figure 7A:
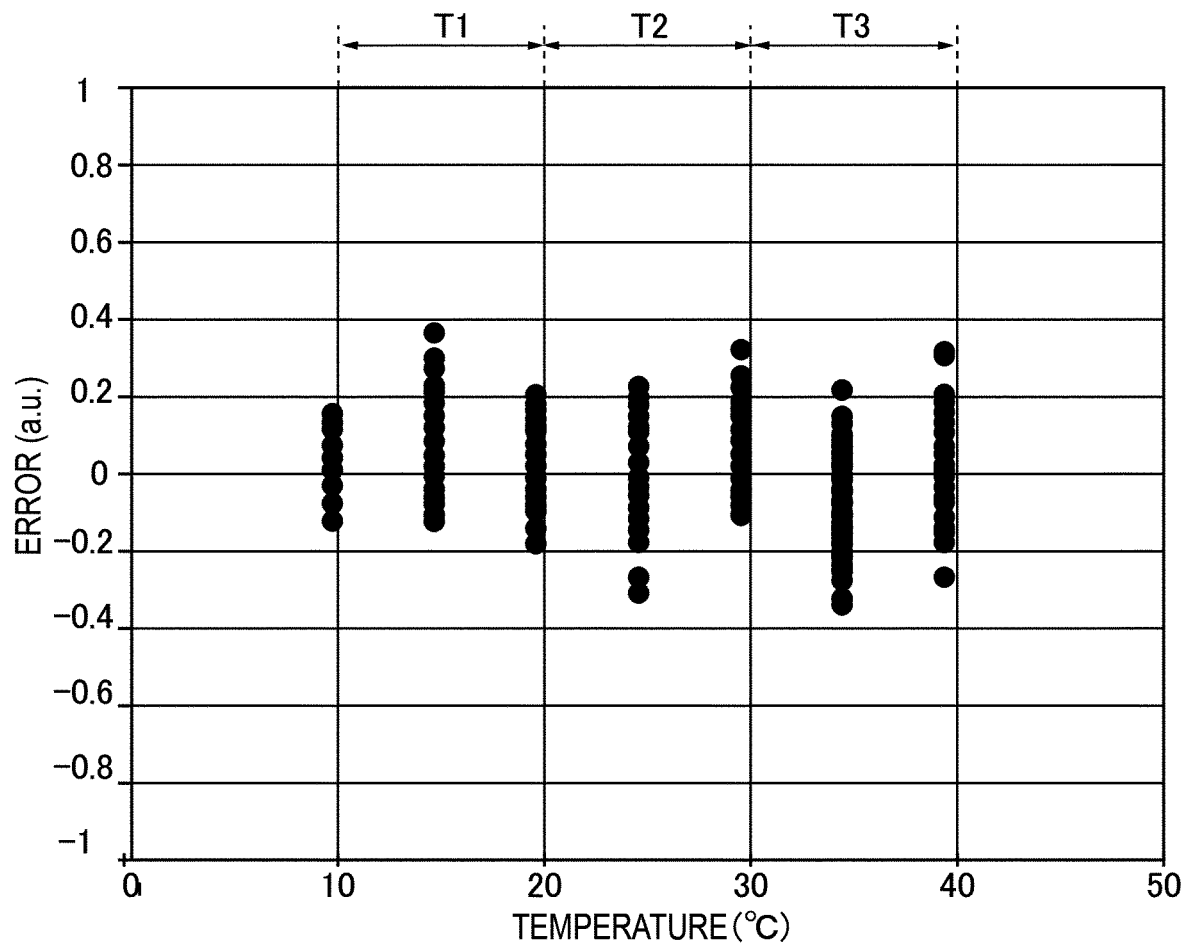
FIG. 7A is an example of the graph representing the temperature dependency of the error of the signal obtained by performing concentration conversion of the correction signal Sc when linear correction of three temperature segments is performed at four correction temperature points.

FIG. 7A is an example of the graph representing the temperature dependency of the error of the signal obtained by performing concentration conversion of the correction signal Sc when linear correction of three temperature segments is performed at four correction temperature points. In the present example, the linear correction is performed in three temperature segments T1 to T3 between each of temperatures of 10° C., 20° C., 30° C., and 40° C. at four correction temperature points at 10° C., 20° C., 30° C., and 40° C. When the concentration measurement apparatus 100 performs the linear correction, even when there are many correction temperature points and the number of temperature segments becomes three, an increase in the wavelike error at temperatures other than the correction temperature points as in a case where a polynomial is used does not occur.

Figure 7B:
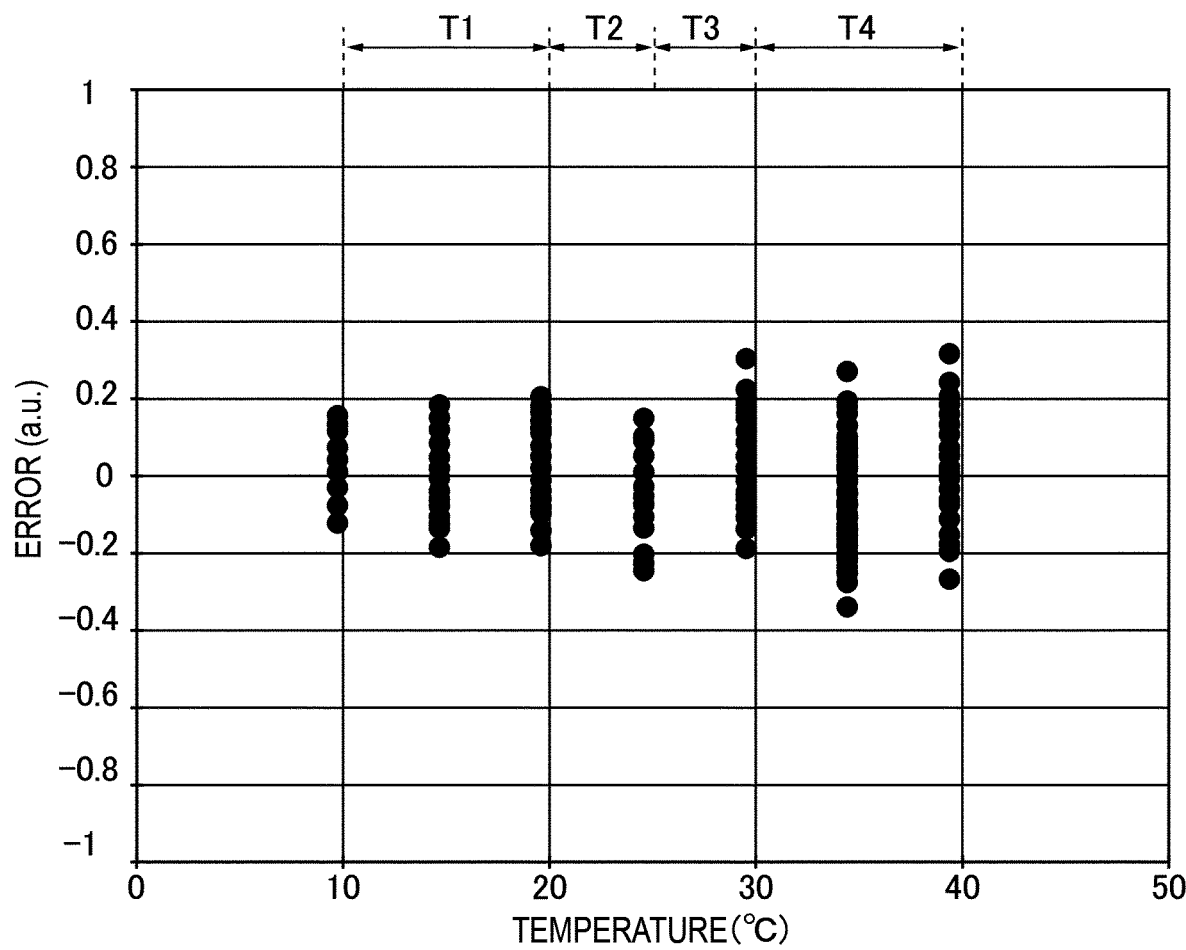
FIG. 7B is an example of the graph representing the temperature dependency of the error of the signal obtained by performing the concentration conversion of the correction signal Sc when the linear correction of four temperature segments is performed at five correction temperature points.

FIG. 7B is an example of the graph representing the temperature dependency of the error of the signal obtained by performing the concentration conversion of the correction signal Sc when the linear correction of four temperature segments is performed at five correction temperature points. In the present example, the linear correction is performed in four temperature segments T1 to T4 between each of temperatures of 10° C., 20° C., 25° C., 30° C., and 40° C. at five correction temperature points at 10° C., 20° C., 25° C., 30° C., and 40° C. In this manner, a configuration may be adopted where widths of the three or more temperature segments in which the concentration measurement apparatus 100 performs the linear correction are not equal to each other. When the concentration measurement apparatus 100 performs the linear correction, even when there are many correction temperature points and the number of temperature segments becomes three or more (in the present example, four), an increase in the wavelike error at temperatures other than the correction temperature points as in a case where a polynomial is used does not occur. On the other hand, the concentration measurement apparatus 100 of the present example can reduce the wavelike error at the temperatures other than the correction temperature points by adding a new correction temperature point to a segment in which the wavelike error at the temperatures other than the correction temperature point is generated in the comparative example.

Figure 7C:
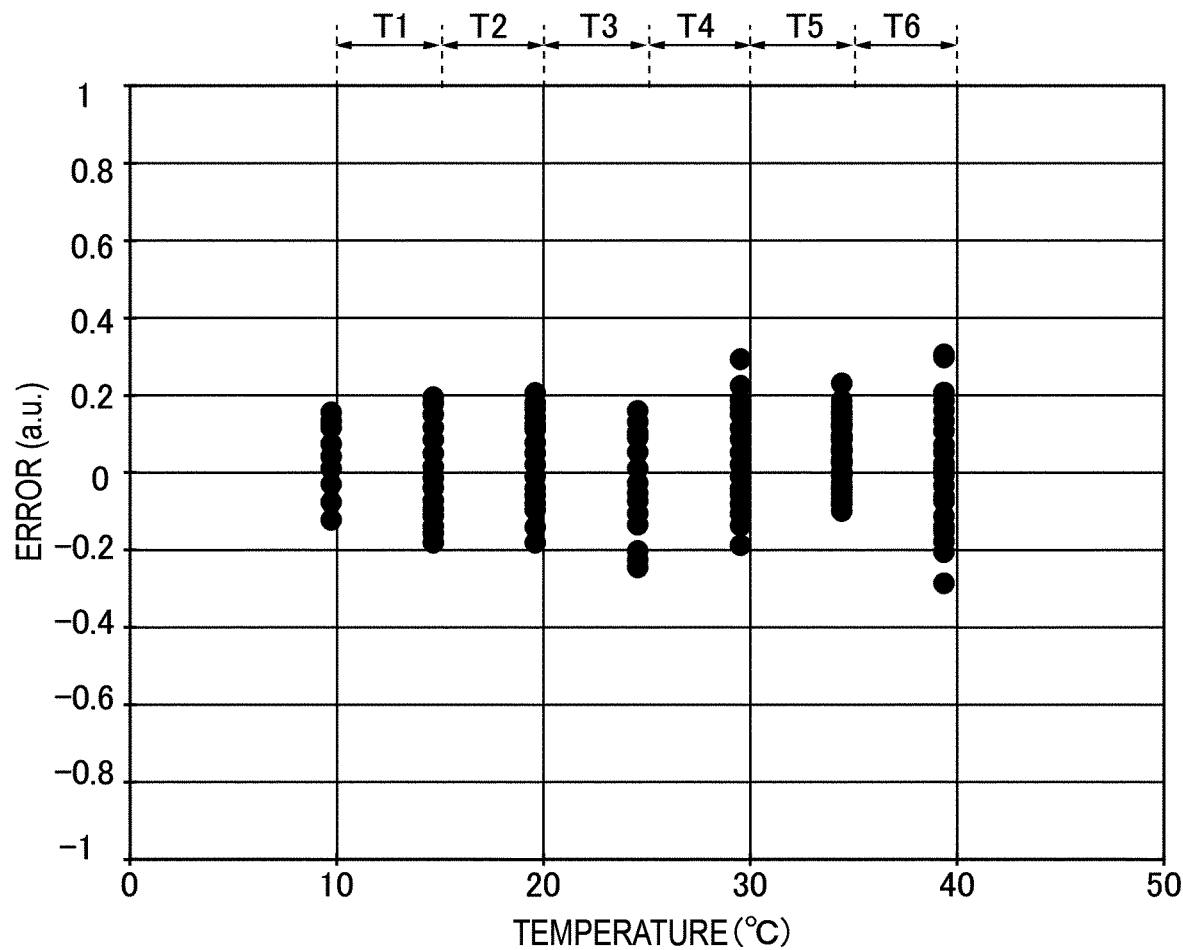
FIG. 7C illustrates an example of the error of the signal obtained by performing the concentration conversion of the correction signal Sc when the linear correction of six temperature segments is performed at seven correction temperature points.

FIG. 7C illustrates an example of the error of the signal obtained by performing the concentration conversion of the correction signal Sc when the linear correction of six temperature segments is performed at seven correction temperature points. In the present example, the linear correction is performed with six divided temperature segments T1 to T6 at every 5° C. from 10° C. to 40° C. Similarly as in the examples of FIG. 7A and FIG. 7B, when the concentration measurement apparatus 100 performs the linear correction, even when the number of temperature segments becomes three or more (in the present example, six), an increase in the wavelike error at temperatures other than the correction temperature points as in a case where a polynomial is used does not occur. In the comparative example, as the number of correction temperature points is increased, it is conceivable that the correction is to be performed using a polynomial of a still higher degree, but in the present example, even when there are many correction temperature points and the number of the temperature segments is high, it is possible to suppress the wavelike error at the temperatures other than the correction temperature points by the linear correction. For example, in the present example, it is possible to reduce the error by approximately 30% as compared with the comparative examples illustrated in FIG. 4B and FIG. 5B.

Figure 8:
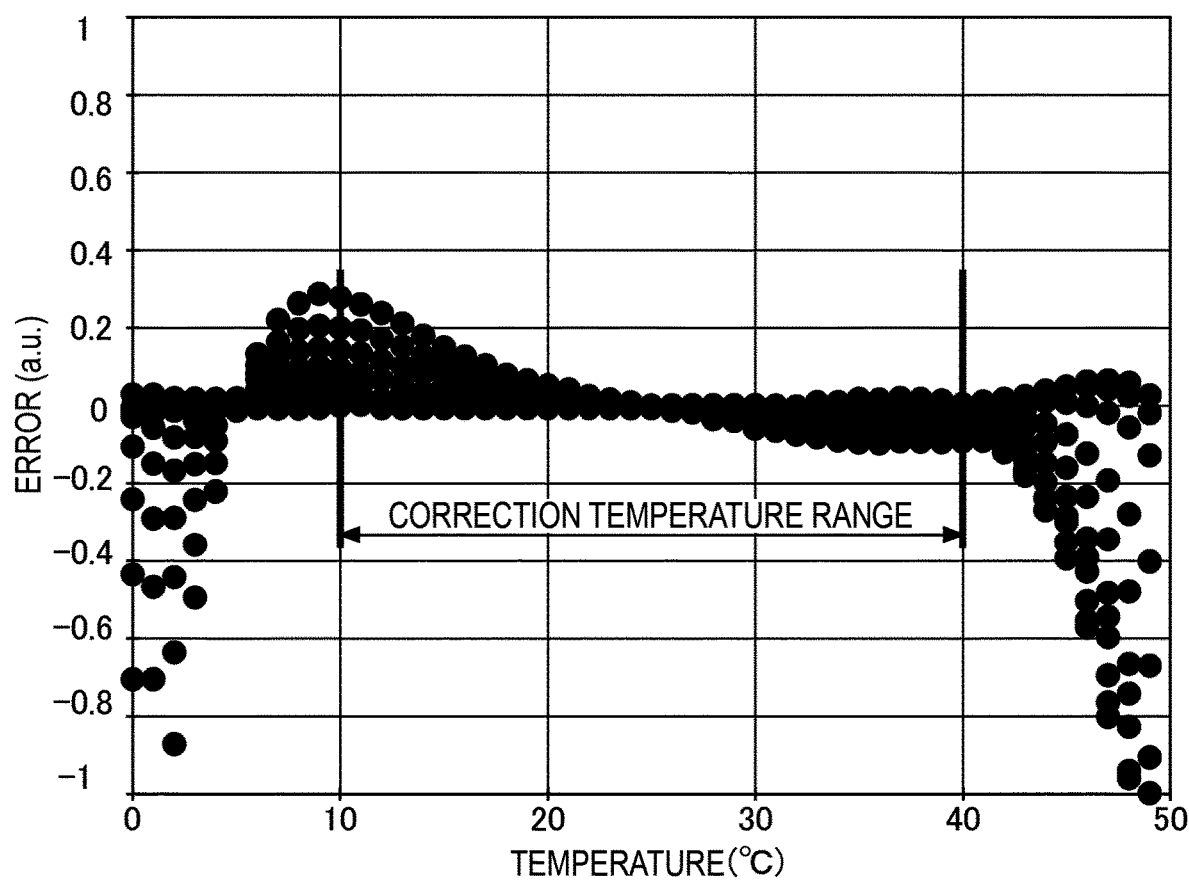
FIG. 8 illustrates a comparative example when the seven correction temperature points are corrected by a polynomial of a sixth degree.

FIG. 8 illustrates a comparative example when seven correction temperature points are corrected by a polynomial of a sixth degree. A correction temperature range of the present example is from 10° C. to 40° C. In the present example, while a signal value obtained at 25° C. is set as a reference, a simulation result in which a variation from 25° C. is calculated is illustrated. Since the correction is performed by the polynomial of the sixth degree, the signal value abruptly varies outside the correction temperature range, and deterioration occurs by overfitting. The overfitting may also decrease reliability of the temperature characteristic correction within the correction temperatures.

Figure 9:
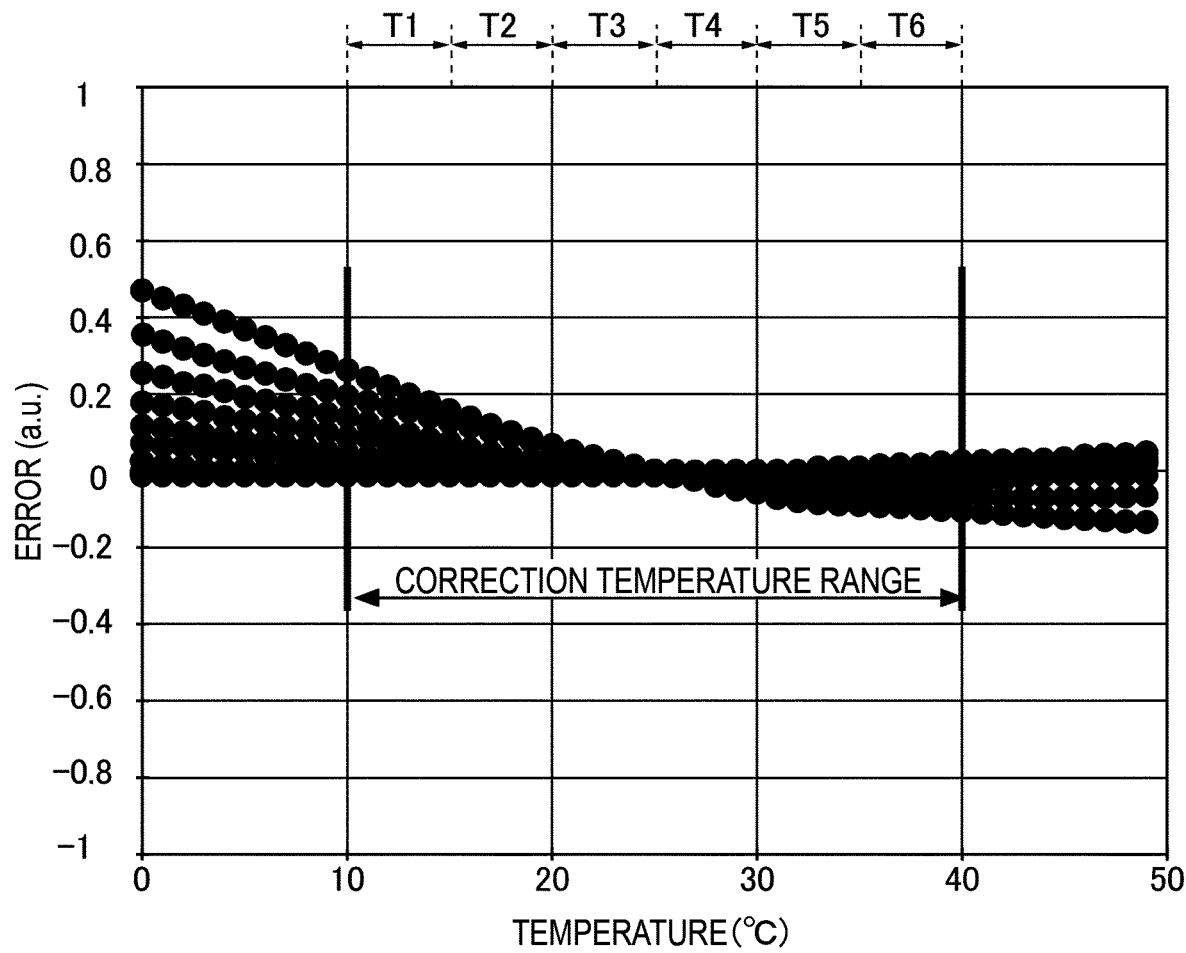
FIG. 9 illustrates an example when the linear correction of six temperature segments is performed at the seven correction temperature points.

FIG. 9 illustrates an example when the linear correction of six temperature segments is performed at seven correction temperature points. In the present example, while a signal value obtained at 25° C. is set as a reference, a simulation result in which a variation from 25° C. is calculated is illustrated. When the linear correction is performed, as compared with a case where the polynomial of the sixth degree of FIG. 8 is used, a behavior becomes largely different, and the present example is clearly more stable outside the correction temperature range.

In this manner, by performing the linear correction of the detection signal Sd for each of the three or more temperature segments, the concentration measurement apparatus 100 is more likely to improve the temperature characteristic even when the number of temperature segments is increased. In addition, since the linear correction of the detection signal Sd is performed for each temperature segment, as compared with a case where the polynomial is used, the concentration measurement apparatus 100 can decrease the number of times to perform multiplication, and it is possible to reduce the computation cost.

By performing the linear correction for each of the three or more temperature segments based on the temperature information It such that the strength and the strength variation of the detection signal Sd are set to be within predetermined reference output ranges in a measurement concentration range, the concentration measurement apparatus 100 calculates the correction signal Sc in which the temperature dependency has been corrected, and outputs the concentration of the measurement object 110 by using the calibration curve data at the predetermined reference temperature. That is, the concentration measurement apparatus 100 utilizes the correction parameter Zero(T) and/or the correction parameter Span(T) represented by a linear expression of the temperature for each of the three or more temperature segments based on the temperature information It to perform the linear correction of the temperature characteristic of the strength and the strength variation of the detection signal Sd. Then, the concentration measurement apparatus 100 calculates the concentration of the measurement object 110 from the correction signal Sc by using the calibration curve data at the predetermined reference temperature. With such a configuration, the temperature characteristic is more likely to be improved even when the number of temperature segments is increased, and as compared with a case where a polynomial is used, the number of times to perform multiplication is decreased, so that the computation cost can be reduced.

A case has been described above where the infrared effect detection unit 20 has the infrared sensor, but the infrared effect detection unit 20 may have a microphone. When the infrared effect detection unit 20 has a microphone, the detection signal Sd may be an acoustic wave signal based on the photoacoustic effect of the measurement object 110. Even when the detection signal Sd is these signals, the correction method of the temperature characteristic described above is effective. That is, the temperature characteristic of these signals can be corrected by using the correction parameter set for the three or more temperature segments, and it is more likely to improve the temperature characteristic even when the number of temperature segments is increased. As compared with a case where a polynomial is used, the number of times to perform multiplication is decreased, and the computation cost can be reduced.

While the embodiments of the present invention have been described, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: light emission unit; 12: optical path portion; 14: reflection portion; 20: infrared effect detection unit; 21: first detection unit; 22: second detection unit; 30: temperature measurement unit; 40: signal processing unit; 41: signal acquisition unit; 42: temperature information acquisition unit; 43: correction unit; 44: calculation unit; 45: storage unit; 50: housing; 100: concentration measurement apparatus; 110: measurement object.

What is claimed is:

1. A concentration measurement apparatus for measuring a concentration of a measurement object using an infrared ray, the concentration measurement apparatus comprising:
    a processor configured to:
        acquire a detection signal to detect an effect of the infrared ray on the measurement object;
        acquire temperature information;
        output a correction signal obtained by correcting a temperature dependency of the detection signal based on the temperature information;
        calculate the concentration of the measurement object according to the correction signal using calibration curve data at a predetermined reference temperature for calculating the concentration of the measurement object; and
        output the correction signal obtained by performing a linear correction of the detection signal using, among predetermined correction parameters different for three or more respective temperature segments, a correction parameter in a temperature segment corresponding to the temperature information.

2. The concentration measurement apparatus according to claim 1, wherein the processor further performs a linear correction of the temperature dependency of the detection signal using the correction parameter different for each of the three or more respective temperature segments.

3. The concentration measurement apparatus according to claim 1, wherein the processor further performs a linear correction of the detection signal such that a strength and a strength variation of the detection signal are set to be within a predetermined reference output range in a measurement concentration range.

4. The concentration measurement apparatus according to claim 1,
    wherein the processor is further configured to output a first output signal obtained by detecting an infrared ray that has passed through the measurement object and output a second output signal obtained by detecting an infrared ray that has not passed through the measurement object, and
    wherein the detection signal is a signal based on the first output signal and the second output signal.

5. The concentration measurement apparatus according to claim 4, wherein the processor further performs a linear correction of the first output signal and/or the second output signal for each of the three or more respective temperature segments.

6. The concentration measurement apparatus according to claim 4, wherein the processor is further configured to measure a temperature of the detected infrared ray that has not passed through the measurement object.

7. The concentration measurement apparatus according to claim 6, wherein the processor further measures a temperature of the detected infrared ray that has not passed through the measurement object based on the second output signal.

8. The concentration measurement apparatus according to claim 6, wherein the processor further measures a temperature of the infrared ray that has not passed through the measurement object based on a resistance value.

9. The concentration measurement apparatus according to claim 1, further comprising:
    a quantum well type sensor that is used by the processor to detect an effect of the infrared ray on the measurement object.

10. The concentration measurement apparatus according to claim 1, further comprising:
    a microphone that is used by the processor to detect an effect of the infrared ray on the measurement object.

11. The concentration measurement apparatus according to claim 1, wherein the processor is further configured to store a correction parameter different for each of the three or more respective temperature segments.

12. The concentration measurement apparatus according to claim 11, wherein the processor further stores the three or more respective temperature segments and the predetermined correction parameters in a tabulated form.

13. The concentration measurement apparatus according to claim 1, further comprising:
a single housing;
wherein the processor is further configured to control emission an emission of an infrared ray; and
an optical path portion through which the infrared ray is to pass through the measurement object, and
wherein the concentration measurement apparatus is housed in the single housing.

14. The concentration measurement apparatus according to claim 1, wherein the concentration of the measurement object is calculated in parts per million (ppm).

15. A concentration measurement method for measuring a concentration of a measurement object through which an infrared ray has passed, the concentration measurement method comprising:
acquiring a detection signal from an infrared effect detection unit configured to detect an effect of the infrared ray on the measurement object;
acquiring temperature information measured by a temperature measurement unit; and
outputting a correction signal obtained by correcting a temperature dependency of the detection signal, a concentration of the measurement object according to the correction signal being calculated using calibration curve data at a predetermined reference temperature for calculating the concentration of the measurement object, wherein
the outputting the correction signal includes performing a linear correction of the detection signal using, among predetermined correction parameters different for three or more respective temperature segments, a correction parameter in a temperature segment corresponding to the temperature information.

16. The concentration measurement method according to claim 15, wherein
the performing a linear correction of the detection signal comprises performing a linear correction of the temperature dependency of the detection signal using the correction parameter different for each of the three or more respective temperature segments.

17. The concentration measurement method according to claim 15, wherein
the performing a linear correction of the detection signal comprises performing a linear correction of the detection signal such that a strength and a strength variation of the detection signal are set to be within a predetermined reference output range in a measurement concentration range.

18. The concentration measurement method according to claim 17, wherein
the predetermined reference output range is determined based on a variation range of the calibration curve data.

19. The concentration measurement method according to claim 15, further comprising:
outputting a first output signal obtained by detecting an infrared ray that has passed through the measurement object, and
outputting a second output signal obtained by detecting an infrared ray that has not passed through the measurement object,
wherein the detection signal is a signal based on the first output signal and the second output signal.

* * * * *